United States Patent
Plante et al.

(10) Patent No.: US 10,053,032 B2
(45) Date of Patent: *Aug. 21, 2018

(54) POWER MANAGEMENT SYSTEMS FOR AUTOMOTIVE VIDEO EVENT RECORDERS

(71) Applicant: SMARTDRIVE SYSTEMS, INC., San Diego, CA (US)

(72) Inventors: James Plante, Del Mar, CA (US); Ramesh Kasavaraju, San Diego, CA (US); Bruce Lightner, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,707

(22) Filed: Dec. 6, 2016

(65) Prior Publication Data

US 2017/0080882 A1    Mar. 23, 2017

Related U.S. Application Data

(63) Continuation of application No. 14/177,047, filed on Feb. 10, 2014, now Pat. No. 9,554,080, which is a
(Continued)

(51) Int. Cl.
*G06F 19/00* (2018.01)
*G06F 7/00* (2006.01)
(Continued)

(52) U.S. Cl.
CPC .............. *B60R 16/03* (2013.01); *B60R 11/04* (2013.01); *F02P 5/02* (2013.01); *G07C 5/0808* (2013.01);
(Continued)

(58) Field of Classification Search
CPC ........ G08G 1/0104; G08G 1/20; B60R 11/04; B60R 16/03
See application file for complete search history.

(56) References Cited

U.S. PATENT DOCUMENTS 2,943,141 A    6/1960 Knight
3,634,866 A    1/1972 Meyer
(Continued)

FOREIGN PATENT DOCUMENTS

CA    2469728        12/2005
CA    2469728 A1    12/2005
(Continued)

OTHER PUBLICATIONS

World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011. (1 pg.).
(Continued)

*Primary Examiner* — Khoi H Tran
*Assistant Examiner* — Jorge O Peche
(74) *Attorney, Agent, or Firm* — Sheppard Mullin Richter & Hampton LLP

(57) ABSTRACT

Video event recorders are coupled to a vehicle power source via an on-board diagnostic system including its power bus, data bus, and scanner port connector. Video event recorders are provided with a power input arranged in conjunction with a standard ODBII type "D" connector. Systems further include an extension cable between the connection and the vehicle event record to accommodate mounting needs associated with each. In advanced versions, both OBD power and data networks are coupled to the vehicle event recorded such that data relating to vehicle diagnostic systems can be captured in a triggered event along with video data. In
(Continued)

US 10,053,032 B2

Page 2 addition, some versions are provided with special detection mechanism to determine the use state of a vehicle and adjust application of power accordingly. Thus an "in-use" detector is coupled to the vehicle and/or OBD systems to provide feedback which helps to conserve power and regulate the power connections.

16 Claims, 3 Drawing Sheets

Related U.S. Application Data continuation of application No. 11/593,682, filed on Nov. 7, 2006, now Pat. No. 8,649,933.

(51) Int. Cl.
<table>
<tr><td>B60R 16/03</td><td>(2006.01)</td></tr>
<tr><td>B60R 11/04</td><td>(2006.01)</td></tr>
<tr><td>H04N 5/77</td><td>(2006.01)</td></tr>
<tr><td>F02P 5/02</td><td>(2006.01)</td></tr>
<tr><td>G07C 5/08</td><td>(2006.01)</td></tr>
<tr><td>G07C 5/12</td><td>(2006.01)</td></tr>
<tr><td>H04N 5/232</td><td>(2006.01)</td></tr>
</table>

(52) U.S. Cl.
CPC ............ *G07C 5/12* (2013.01); *H04N 5/23241* (2013.01); *H04N 5/77* (2013.01)

(56) References Cited

U.S. PATENT DOCUMENTS

| | | |
|---|---|---|
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis, Jr. |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | dAlayer de Costemore dArc |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Hu/tter |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhauser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | Van Blessinger |
| 5,140,436 A | 8/1992 | Blessinger |
| 5,140,438 A | 8/1992 | Kurahashi |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,333,759 A | 8/1994 | Deering |
| 5,343,527 A | 8/1994 | Moore |
| 5,353,023 A | 10/1994 | Mitsugi |
| 5,361,326 A | 11/1994 | Aparicio, IV |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley, Jr. |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Nather |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,513,011 A | 4/1996 | Matsumoto |

(56) References Cited

U.S. PATENT DOCUMENTS

| | | |
|---|---|---|
| 5,515,285 A | 5/1996 | Garrett, Sr. |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,596,647 A | 1/1997 | Wakai |
| 5,600,775 A | 2/1997 | King |
| 5,608,272 A | 3/1997 | Tanguay |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant, Jr. |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | Van Ryzin |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | OFarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,021 A | 7/2000 | Ehlbeck |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Bague |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 * | 7/2001 | Ramachandran .... B60Q 1/0023 348/117 |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |

(56) References Cited

U.S. PATENT DOCUMENTS

| | | |
|---|---|---|
| 6,356,823 B1 | 3/2002 | Iannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |
| 6,449,540 B1 | 9/2002 | Rayner |
| 6,456,321 B1 | 9/2002 | Ito |
| 6,469,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B1 | 4/2003 | Fan |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,779,716 B1 | 8/2004 | Grow |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | deLeon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose, Jr. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 * | 1/2008 | Luskin .................. H04L 67/34 701/31.5 |
| 7,343,306 B1 | 3/2008 | Bates |
| 7,348,695 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,398,140 B2 | 7/2008 | Kernwein |
| 7,457,693 B2 | 11/2008 | Olsen |
| 7,471,189 B2 | 12/2008 | Vastad |
| 7,471,192 B2 | 12/2008 | Hara |
| 7,536,457 B2 | 5/2009 | Miller |
| 7,548,586 B1 | 6/2009 | Mimar |
| 7,561,054 B2 | 7/2009 | Raz |
| 7,584,033 B2 | 9/2009 | Mittelsteadt |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,689,001 B2 | 3/2010 | Kim |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |

(56) References Cited

U.S. PATENT DOCUMENTS

| | | |
|---|---|---|
| 7,804,426 B2 | 9/2010 | Etcheson |
| 7,821,421 B2 | 10/2010 | Tamir |
| 7,845,560 B2 | 12/2010 | Emanuel |
| 7,853,376 B2 | 12/2010 | Peng |
| 7,868,912 B2 | 1/2011 | Venetianer |
| 7,893,958 B1 | 2/2011 | DAgostino |
| 7,904,219 B1* | 3/2011 | Lowrey .................. G01C 21/26 701/32.3 |
| 7,940,250 B2 | 5/2011 | Forstall |
| 7,941,258 B1 | 5/2011 | Mittelsteadt |
| 7,974,748 B2 | 7/2011 | Goerick |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,634,958 B1 | 1/2014 | Chiappetta |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2* | 8/2014 | Rhoads ............. G06F 17/30241 382/255 |
| 8,849,501 B2 | 9/2014 | Cook |
| 8,855,847 B2 | 10/2014 | Uehara |
| 8,862,395 B2 | 10/2014 | Richardson |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,085,362 B1 | 7/2015 | Kilian |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 9,607,526 B1 | 3/2017 | Hsu-Hoffman |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1* | 6/2002 | Talbot ................... B60R 11/04 307/10.1 |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0152145 A1* | 8/2003 | Kawakita ................. H04N 5/77 375/240.12 |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0117638 A1 | 6/2004 | Monroe |
| 2004/0130794 A1 | 7/2004 | Saito |
| 2004/0135979 A1 | 7/2004 | Hazelton |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |
| 2004/0230370 A1 | 11/2004 | Tzamaloukas |
| 2004/0230373 A1 | 11/2004 | Tzamaloukas |

(56) References Cited

U.S. PATENT DOCUMENTS

| | | |
|---|---|---|
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2004/0267419 A1 | 12/2004 | Jeng |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1* | 6/2005 | Luskin ............... H04L 67/34 701/1 |
| 2005/0131595 A1* | 6/2005 | Luskin ............... G06Q 50/30 701/31.4 |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1* | 7/2005 | Carmichael ............ G01S 7/003 342/52 |
| 2005/0149238 A1 | 7/2005 | Stefani |
| 2005/0149259 A1 | 7/2005 | Cherveny |
| 2005/0152353 A1 | 7/2005 | Couturier |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171092 A1 | 8/2005 | Hamblon |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Holst |
| 2005/0200714 A1 | 9/2005 | Marchese |
| 2005/0203683 A1 | 9/2005 | Olsen |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1* | 10/2005 | Okajima ............ G06T 15/40 463/31 |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | deWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1* | 6/2006 | Kim ................... G06Q 30/00 |
| 2006/0142913 A1 | 6/2006 | Coffee |
| 2006/0143435 A1* | 6/2006 | Kwon ................. G06F 21/10 713/150 |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly |
| 2006/0209840 A1 | 9/2006 | Paatela |
| 2006/0212195 A1 | 9/2006 | Veith |
| 2006/0215884 A1 | 9/2006 | Ota |
| 2006/0226344 A1* | 10/2006 | Werth ................. B60Q 1/245 250/214 VT |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1* | 6/2007 | Plante ................. G06Q 10/00 348/148 |
| 2007/0142986 A1* | 6/2007 | Alaous ................. G07C 5/0858 701/33.4 |
| 2007/0143499 A1 | 6/2007 | Cheng |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1* | 8/2007 | Grenn ................. B60W 50/029 701/31.4 |
| 2007/0183635 A1 | 8/2007 | Weidhaas |
| 2007/0208494 A1 | 9/2007 | Chapman |
| 2007/0213920 A1 | 9/2007 | Igarashi |
| 2007/0216521 A1 | 9/2007 | Guensler |
| 2007/0217670 A1 | 9/2007 | Bar-Am |
| 2007/0219685 A1 | 9/2007 | Plante |
| 2007/0219686 A1* | 9/2007 | Plante ................. G07C 5/008 701/33.4 |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0262855 A1 | 11/2007 | Zuta |
| 2007/0263984 A1* | 11/2007 | Sterner ................. G11B 27/034 386/234 |
| 2007/0268158 A1 | 11/2007 | Gunderson |
| 2007/0271105 A1 | 11/2007 | Gunderson |

(56) References Cited

U.S. PATENT DOCUMENTS

| | | |
|---|---|---|
| 2007/0273480 A1 | 11/2007 | Burkman |
| 2007/0279214 A1 | 12/2007 | Buehler |
| 2007/0280677 A1 | 12/2007 | Drake |
| 2007/0299612 A1 | 12/2007 | Kimura |
| 2008/0030988 A1 | 2/2008 | Williams |
| 2008/0035108 A1 | 2/2008 | Ancimer |
| 2008/0059019 A1* | 3/2008 | Delia ............... G07C 5/085 701/33.4 |
| 2008/0071827 A1 | 3/2008 | Hengel |
| 2008/0111666 A1* | 5/2008 | Plante ............... G07C 5/008 340/425.5 |
| 2008/0122603 A1 | 5/2008 | Plante |
| 2008/0137912 A1 | 6/2008 | Kim |
| 2008/0143834 A1* | 6/2008 | Comeau ............... H04N 7/18 348/148 |
| 2008/0147267 A1 | 6/2008 | Plante |
| 2008/0157510 A1 | 7/2008 | Breed |
| 2008/0167775 A1 | 7/2008 | Kuttenberger |
| 2008/0169914 A1 | 7/2008 | Albertson |
| 2008/0177436 A1 | 7/2008 | Fortson |
| 2008/0195261 A1* | 8/2008 | Breed ............... B60R 21/0132 701/2 |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1* | 12/2009 | Mouilleseaux ... G06F 17/30781 715/230 |
| 2010/0030423 A1 | 2/2010 | Nathanson |
| 2010/0045451 A1 | 2/2010 | Periwal |
| 2010/0047756 A1 | 2/2010 | Schneider |
| 2010/0049516 A1 | 2/2010 | Talwar |
| 2010/0054709 A1* | 3/2010 | Misawa ............... G06F 3/1454 386/239 |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1* | 4/2010 | Lee ............... G06T 15/005 345/419 |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1* | 8/2010 | Rood ............... G09F 27/00 348/552 |
| 2010/0220892 A1 | 9/2010 | Kawakubo |
| 2010/0250020 A1 | 9/2010 | Lee |
| 2010/0250022 A1 | 9/2010 | Hines |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0153367 A1 | 6/2011 | Amigo |
| 2011/0161116 A1 | 6/2011 | Peak |
| 2011/0166773 A1* | 7/2011 | Raz ............... B60W 40/09 701/123 |
| 2011/0172864 A1 | 7/2011 | Syed |
| 2011/0173015 A1 | 7/2011 | Chapman |
| 2011/0208428 A1* | 8/2011 | Matsubara ............ G01C 21/367 701/532 |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1* | 10/2011 | Perkins ............... G06Q 10/04 701/123 |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9 | 11/2011 | Nielsen |
| 2011/0283223 A1 | 11/2011 | Vaittinen |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1* | 7/2012 | Taneyhill ............ B60K 31/0008 340/453 |
| 2012/0190001 A1 | 7/2012 | Knight |
| 2012/0198317 A1 | 8/2012 | Eppolito |
| 2012/0203402 A1 | 8/2012 | Jape |
| 2012/0210252 A1 | 8/2012 | Fedoseyeva |
| 2012/0269383 A1 | 10/2012 | Bobbitt |
| 2012/0277950 A1 | 11/2012 | Plante |
| 2012/0280835 A1 | 11/2012 | Raz |
| 2012/0283895 A1 | 11/2012 | Noda |
| 2012/0330528 A1 | 12/2012 | Schwindt |
| 2013/0004138 A1 | 1/2013 | Kilar |
| 2013/0006469 A1 | 1/2013 | Green |
| 2013/0018534 A1 | 1/2013 | Hilleary |
| 2013/0021148 A1 | 1/2013 | Cook |
| 2013/0028320 A1 | 1/2013 | Gardner |
| 2013/0030660 A1 | 1/2013 | Fujimoto |
| 2013/0048795 A1 | 2/2013 | Cross |
| 2013/0073112 A1* | 3/2013 | Phelan ............... G06Q 40/00 701/1 |
| 2013/0073114 A1 | 3/2013 | Nemat-Nasser |
| 2013/0096731 A1 | 4/2013 | Tamari |
| 2013/0127980 A1 | 5/2013 | Haddick |
| 2013/0145269 A1 | 6/2013 | Latulipe |
| 2013/0151980 A1* | 6/2013 | Lee ............... G06F 17/30873 715/738 |
| 2013/0170762 A1 | 7/2013 | Marti |
| 2013/0197774 A1 | 8/2013 | Denson |

(56) References Cited

U.S. PATENT DOCUMENTS

| | | | |
|---|---|---|---|
| 2013/0209968 A1 | 8/2013 | Miller | |
| 2013/0274950 A1 | 10/2013 | Richardson | |
| 2013/0278631 A1 | 10/2013 | Border | |
| 2013/0317711 A1 | 11/2013 | Plante | |
| 2013/0332004 A1 | 12/2013 | Gompert | |
| 2013/0345927 A1 | 12/2013 | Cook | |
| 2013/0345929 A1 | 12/2013 | Bowden | |
| 2014/0025225 A1 | 1/2014 | Armitage | |
| 2014/0025254 A1 | 1/2014 | Plante | |
| 2014/0032062 A1* | 1/2014 | Baer | G07C 5/08 701/51 |
| 2014/0046550 A1 | 2/2014 | Palmer | |
| 2014/0047371 A1 | 2/2014 | Palmer | |
| 2014/0058583 A1 | 2/2014 | Kesavan | |
| 2014/0089504 A1 | 3/2014 | Scholz | |
| 2014/0094992 A1 | 4/2014 | Lambert | |
| 2014/0098228 A1 | 4/2014 | Plante | |
| 2014/0152828 A1 | 6/2014 | Plante | |
| 2014/0226010 A1 | 8/2014 | Molin | |
| 2014/0232803 A1 | 8/2014 | Palige | |
| 2014/0279707 A1 | 9/2014 | Joshua | |
| 2014/0280204 A1 | 9/2014 | Avery | |
| 2014/0300739 A1* | 10/2014 | Mimar | H04N 7/188 348/148 |
| 2014/0309849 A1 | 10/2014 | Ricci | |
| 2014/0335902 A1 | 11/2014 | Guba | |
| 2014/0336916 A1* | 11/2014 | Yun | B60W 40/12 701/123 |
| 2014/0339374 A1 | 11/2014 | Mian | |
| 2015/0000415 A1 | 1/2015 | Kelley | |
| 2015/0022449 A1* | 1/2015 | Cheng | G06F 3/0346 345/163 |
| 2015/0035665 A1 | 2/2015 | Plante | |
| 2015/0057836 A1 | 2/2015 | Plante | |
| 2015/0105934 A1 | 4/2015 | Palmer | |
| 2015/0112542 A1 | 4/2015 | Fuglewicz | |
| 2015/0112545 A1 | 4/2015 | Binion | |
| 2015/0134226 A1 | 5/2015 | Palmer | |
| 2015/0135240 A1* | 5/2015 | Shibuya | H04N 21/2347 725/81 |
| 2015/0156174 A1 | 6/2015 | Fahey | |
| 2015/0170428 A1* | 6/2015 | Harter | G07C 5/008 701/31.5 |
| 2015/0189042 A1* | 7/2015 | Sun | H04W 76/14 709/217 |
| 2015/0203116 A1 | 7/2015 | Fairgrieve | |
| 2015/0222449 A1 | 8/2015 | Salinger | |
| 2015/0317846 A1 | 11/2015 | Plante | |
| 2015/0371462 A1 | 12/2015 | Ramesh | |
| 2016/0054733 A1 | 2/2016 | Hollida | |

FOREIGN PATENT DOCUMENTS

| | | |
|---|---|---|
| CA | 2692415 | 8/2011 |
| CA | 2692415 A1 | 8/2011 |
| DE | 4416991 A1 | 11/1995 |
| DE | 20311262 | 9/2003 |
| DE | 202005008238 | 8/2005 |
| DE | 102004004669 | 12/2005 |
| DE | 102004004669 A1 | 12/2005 |
| EP | 0708427 A2 | 4/1996 |
| EP | 0840270 A2 | 5/1998 |
| EP | 0848270 A2 | 6/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 244694 | 8/2008 |
| GB | 2447184 B | 6/2011 |
| GD | 2451485 | 2/2000 |
| JP | 58085110 | 5/1983 |
| JP | S5885110 A | 6/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 | 7/2002 |
| JP | 2002191017 A | 7/2002 |
| JP | 5294188 | 9/2013 |
| KR | 1000588169 | 6/2006 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0048033 | 2/2000 |
| WO | 0077620 | 2/2000 |
| WO | 0028410 A1 | 5/2000 |
| WO | 0123214 | 4/2001 |
| WO | 0125054 | 4/2001 |
| WO | 0146710 A2 | 6/2001 |
| WO | 03045514 | 6/2003 |
| WO | 2005095175 A1 | 10/2005 |
| WO | 2006022824 | 3/2006 |
| WO | 2006022824 A2 | 3/2006 |
| WO | 2007067767 | 1/2007 |
| WO | 2007109091 | 9/2007 |
| WO | 2009081234 | 7/2009 |
| WO | 2011055743 A1 | 5/2011 |
| WO | 2013072939 | 5/2013 |
| WO | 2013159853 | 10/2013 |

OTHER PUBLICATIONS

Written Opinion issued in PCT/US07/68328 dated Oct. 15, 2007. (3 pgs.).

Written Opinion of the International Searching Authority for PCT/US2006/47042, dated Feb. 25. 2008 (5 pages).

Written Opinion of the International Searching Authority for PCT/US2006/47055, dated Mar. 20, 2008 (5 pages).

"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.

"DriveCam Driving Feedback System", DriveCam brochure, Jun. 12, 2001, Document #6600128, 2 pages.

"DriveCam Driving Feedback System" DriveCam brochure, Mar. 15, 2004, 4 pages.

"DriveCam Passenger Transportation Module", DriveCam brochure, Oct. 26, 2001, 2 pages.

"DriveCam Video Event Data Recorder", DriveCam brochure, Nov. 6, 2002, Document #6600127, 2 pages.

"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.

"Sonic MyDVD 4.0: Tutorial: Trimming video segments". Tutorial for software bundled with Adaptec VideoOh! DVD USB 2.0 Edition, 2003, 13 pages.

(56) References Cited

OTHER PUBLICATIONS

"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.
Dan Maher, "DriveCam Taking Risk Out of Driving", DriveCam brochure folder, Jun. 6, 2005, 6 pages.
Del Lisk, "DriveCam Training Seminar" Handout, 2004, 16 pages.
European Examination Report issued in EP 07772812.9 dated Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance U.S. Appl. No. 11/566,424, dated Feb. 26, 2010, 6 pages.
Notice of Allowance for U.S. Appl. No. 11/377,164, dated Dec. 3, 2014, 5 pages.
Notice of Allowance for U.S. Appl. No. 11/377,164, dated Feb. 13, 2015, 2 pages.
Notice of Allowance for U.S. Appl. No. 11/377,164, dated Feb. 25, 2014, 2 pages.
Notice of Allowance for U.S. Appl. No. 11/377,164, dated Nov. 18, 2013, 7 pages.
Notice of Allowance for U.S. Appl. No. 11/377,167, dated Apr. 1, 2015, 7 pages.
Notice of Allowance for U.S. Appl. No. 11/800,876, dated Apr. 19, 2012, 8 pages.
Notice of Allowance for U.S. Appl. No. 13/957,810, dated Jun. 8, 2015, 10 pages.
USPTO Final Office Action for U.S. Appl. No. 11/296,906, dated Aug. 8, 2012, 15 pages.
USPTO Final Office Action for U.S. Appl. No. 12/096,591, dated Dec. 5, 2014, 23 pages.
USPTO Final Office Action for U.S. Appl. No. 12/096,591, dated Jul. 18, 2012, 15 pages.
USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for U.S. Appl. No. 11/377,164, dated Apr. 7, 2014, 7 pages.
USPTO Non-Final Office Action for U.S. Appl. No. 11/377,164, dated Aug. 18, 2014, 5 pages.
USPTO Non-Final Office Action for U.S. Appl. No. 11/377,164, dated Sep. 10, 2012, 10 pages.
USPTO Non-Final Office Action for U.S. Appl. No. 11/377,167, dated Jun. 27, 2013, 11 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
Inovate Motorsports, OT-1 16 Channel OBD-II Interface User Manual, Version 1.0, Nov. 28, 2007, pp. 3, 4, 21 and 27.
PCT International Search Report and Written Opinion for PCT/US15/60721 dated Feb. 26, 2016, 11 pages.
Trivinci Systems, LLC, "Race-Keeper System User Guide", V1 .1.02, Jan. 2011, p. 21.
USPTO Non-Final Office Action dated Jan. 4, 2016 in U.S. Appl. No. 14/529,134, filed Oct. 30, 2014 (65 pgs).

PCT International Search Report and Written Opinion for PCT/IB16/51863, dated Sep. 16, 2016 (18 pgs.).
PCT International Search Report and Written Opinion for PCT/US2016/012757 dated Mar. 18, 2016 (11 pgs.).
Edwin Olson, A Passive Solution to the Sensor Synchronization Problem, the 2010 IEEE/RSJ International Conference on Intelligent Robots and Systems, Oct. 18-22, 2010, 6 pages.
Patent Abstracts of Japan vol. 011, No. 292 (E-543), Sep. 19, 1987 (Sep. 19, 1987) JP 62 091092 A (OK ENG:KK), Apr. 25, 1987 (Apr. 25, 1987) (1 pg.).
Patent Abstracts of Japan vol. 012, No. 001 (M-656), Jan. 6, 1988 (Jan. 6, 1988) JP 62 166135 A (Fuji Electric Co Ltd), Jul. 22, 1987 (Jul. 22, 1987) (1 pg.).
Patent Abstracts of Japan vol. 014, No. 222 (E-0926), May 10, 1990 (May 10, 1990) JP 02 056197 A (Sanyo Electric Co Ltd), Feb. 26, 1990 (Feb. 26, 1990) (1 pg.).
Patent Abstracts of Japan vol. 017, No. 039 (E-1311), Jan. 25, 1993 (Jan. 25, 1993) JP 04 257189 A (Sony Corp), Sep. 11, 1992 (Sep. 11, 1992) (1 pg.).
Patent Abstracts of Japan vol. 017, No. 521 (E-1435), Sep. 20, 1993 (Sep. 20, 1993) JP 05 137144 A (Kyocera Corp), Jun. 1, 1993 (Jun. 1, 1993) (7 pgs.).
Patent Abstracts of Japan vol. 1996, No. 09, Sep. 30, 1996 (Sep. 30, 1996) JP 08 124069 A (Toyota Motor Corp), May 17, 1996 (May 17, 1996) (15 pgs.).
Patent Abstracts of Japan vol. 1997, No. 10, Oct. 31, 1997 (Oct. 31, 1997) JP 09 163357 A (Nippon Soken Inc), Jun. 20, 1997 (Jun. 20, 1997) (1 pg.).
Patent Abstracts of Japan vol. 1998, No. 02, Jan. 30, 1998 (Jan. 30, 1998) JP 09 272399 A (Nippon Soken Inc), Oct. 21, 1997 (Oct. 21, 1997) (1 pg.).
Patent Abstracts of Japan vol. 1998, No. 8, Jun. 30, 1998 (Jun. 30, 1998) JP 10 076880 A (Muakami Corp), Mar. 24, 1998 (Mar. 24, 1998) (1 pg.).
PCT/US2010/022012, Invitation to Pay Additional Fees with Communication of Partial International Search, dated Jul. 21, 2010. (4 pgs.).
Peter G. Thurlow, Letter (including exhibits) Regarding Patent Owner's Response to Initial Office Action in Ex Parte Reexamination, Mar. 27, 2012. (78 pgs.).
Preliminary Claim Construction and Identification of Extrinsic Evidence of Defendant/Counterclaimant SmartDriveSystems, Inc.' in *DriveCam, Inc.* v. *SmartDrive Systems, Inc.*, Case No. 3:11-CV-00997-H (RBB), for the Southern District of California. Nov. 8, 2011. (13 pgs.).
Quinn Maughan, 'DriveCam Enterprise Services', Jan. 5, 2006 (2 pgs.).
Quinn Maughan, 'DriveCam Managed Services', Jan. 5, 2006. (2 pgs.).
Quinn Maughan, 'DriveCam Standard Edition', Jan. 5, 2006. (2 pgs.).
Quinn Maughan, 'DriveCam Unit Installation', Jul. 21, 2005 (9 pgs.).
Quinn Maughan, 'Enterprise Services', Apr. 17, 2006 (2 pgs.).
Quinn Maughan, 'Enterprise Services', Apr. 7, 2006 (2 pgs.).
Quinn Maughan, 'Hindsight Installation Guide', Sep. 29, 2005 (55 pgs.).
Quinn Maughan, 'Hindsight Users Guide', Jun. 7, 2005 (80 pgs.).
Ronnie Rittenberry, 'Eyes on the Road', Jul. 2004 (2 pgs.).
SmartDrives Systems, Inc's Production, SO14246-S014255, Nov. 16, 2011 (1 pg.).
Supplement to DriveCam's Disclosure of Asserted Claims and Preliminary Infringement Contentions' in *DriveCam, Inc.* v. *SmartDrive Systems, Inc.*, Case No. 3:11-CV-00997-H-RBB, for the Southern District of California. Oct. 14, 2011. (7 pgs.).
The DriveCam, Nov. 8, 2002. (2 pgs.).
The DriveCam, Nov. 8, 2002 (2 pgs.).
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012. (4 pgs.).

(56) References Cited

OTHER PUBLICATIONS

Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010. (52 pgs.).
U.S. Appl. No. 11/377,167, Final Office Action dated Nov. 8, 2013. (19 pgs.).
U.S. Appl. No. 11/377,157, filed Mar. 16, 2006 entitled, "Vehicle Event Recorder Systems and Networks Having Parallel Communications Links" (28 pgs.).
U.S. Appl. No. 11/377,167, filed Mar. 16, 2006 entitled, "Vehicle Event Recorder Systems and Networks Having Integrated Cellular Wireless Communications Systems" (29 pgs.).
USPTO Final Office Action for U.S. Appl. No. 11/297,669, dated Nov. 7, 2011, 15 pages.
USPTO Final Office Action for U.S. Appl. No. 13/957,810, dated Jun. 27, 2014, 24 pages.
USPTO Non-Final Office Action for U.S. Appl. No. 11/296,906, dated Apr. 2, 2009, 7 pages.
USPTO Non-Final Office Action for U.S. Appl. No. 11/290,900, dated Nov. 6, 2000, 9 pages.
USPTO Non-Final Office Action for U.S. Appl. No. 11/297,889, dated Apr. 28, 2011, 11 pages.
USPTO Non-Final Office Action for U.S. Appl. No. 11/299,028, dated Apr. 24, 2008, 9 pages.
USPTO Non-Final Office Action for U.S. Appl. No. 11/377,164, dated Nov. 19, 2007, 7 pages.
USPTO Non-Final Office Action for U.S. Appl. No. 11/377,164, dated Nov. 25, 2011, 9 pages.
USPTO Non-Final Office Action for U.S. Appl. No. 11/377,164, dated Sep. 11, 2008, 8 pages.
USPTO Non-Final Office Action for U.S. Appl. No. 11/377,167, dated Jun. 5, 2008, 11 pages.
USPTO Non-Final Office Action for U.S. Appl. No. 11/800,876, dated Dec. 1, 2010, 12 pages.
USPTO Non-Final Office Action for U.S. Appl. No. 11/800,876, dated Dec. 20, 2011, 8 pages.
USPTO Non-Final Office Action for U.S. Appl. No. 12/096,591, dated May 20, 2014, 19 pages.
USPTO Non-Final Office Action for U.S. Appl. No. 14/036,299, dated Aug. 12, 2014. (14 pgs.).
USPTO Non-Final Office Action for U.S. Appl. No. 11/296,907, dated Mar. 22, 2007 (17 pages).
USPTO Non-final Office Action dated Aug. 27, 2009 during prosecution of U.S. Appl. No. 11/566,424 (25 pgs.).
USPTO Non-Final Office Action dated Nov. 27, 2013 in U.S. Appl. No. 13/957,810, filed Aug. 2, 2013. (19 pgs.).
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
GE published its VCR User's Guide for Model VG4255 in 1995. (44 pgs.).
Glenn Oster, 'Hindsight 20/20 v4.0 Software Installation', 1 of 2, Jun. 20, 2003 (2 pgs.).
Glenn Oster, 'HindSight 20/20 v4.0 Software Installation', 2 of 2, Jun. 20, 2003. (54 pgs.).
Glenn Oster, 'Illuminator Installation', Oct. 3, 2004 (2 pgs.).
Hans Fantel, Video; Search Methods Make a Difference in Picking VCR's, NY Times, Aug. 13, 1989. (1 pg.).
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY &Categorys- ub.-Code=coaching)., printed from site on Jan. 11, 2012. (4 pgs.).
Inovate Motorsports, OT-1 16 Channel OBD-II Interface User Manual, Version 1.0, Nov. 28, 2007, pp. 3, 4, 21 & 27.
Interior Camera Data Sheet', Oct. 26, 2001 (2 pgs.).
International Search Report and Written Opinion issued in PCT/US07/68325 dated Feb. 27, 2008. (10 pgs.).
International Search Report and Written Opinion issued in PCT/US07/68325 dated Feb. 27, 2008. (2 pgs.).
International Search Report and Written Opinion issued in PCT/US07/68328 dated Oct. 15, 2007. (2 pgs.).
International Search Report and Written Opinion issued in PCT/US07/68329 dated Mar. 3, 2008. (10 pgs.).
International Search Report and Written Opinion issued in PCT/US07/68332 dated Mar. 3, 2008. (8 pgs.).
International Search Report and Written Opinion issued in PCT/US07/68334 dated Mar. 5, 2008. (11 pgs.).
International Search Report for PCTUS2006/47055, dated Mar. 20, 2008 (2 pages).
International Search Report issued in PCT/US2006/47042 dated Feb. 25, 2008 (3 pgs.).
J. Gallagher, 'Lancer Recommends Tech Tool', Insurance and Technology Magazine, Feb. 2002 (1 pg.).
Jean (DriveCam vendor), 'DC Data Sheet', Nov. 6, 2002. (1 pg.).
Jean (DriveCam vendor), 'DriveCam brochure', Nov. 6, 2002. (4 pgs.).
Jean (DriveCam vendor), 'Feedback Data Sheet', Nov. 6, 2002. (1 pg.).
Jean (DriveCam vendor), 'Hindsight 20-20 Data Sheet', Nov. 4, 2002 (2 pg.).
Jessyca Wallace, 'Analyzing and Processing DriveCam Recorded Events', Oct. 6, 2003 (8 pgs.).
Jessyca Wallace, 'Overview of the DriveCam Program', Dec. 15, 2005 (13 pgs.).
Jessyca Wallace, 'The DriveCam Driver Feedback System', Apr. 6, 2004 (21 pgs.).
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Chart in *DriveCam, Inc. v. SmartDrive Systems, Inc.*, Case No. 11-CV-0997-H (RBB), for the Southern District of California, Document 43, filed Dec. 1, 2011, pp. 1-2.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet, U.S. Pat. No. 6,389,340, "Vehicle Data Reporter" for Case No. 3:11-CV-00997-H-RBB, Document 44-1, filed Dec. 1, 2011, pp. 1-10.
Joint Claim Construction Worksheet in *DriveCam, Inc. v. SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc. v. SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004 (9 pgs.).
Julie Stevens, 'Program Support Roll-Out & Monitoring', Jul. 13, 2004 (2 pgs.).
Jung, Sang-Hack, et al., Egomotion Estimation in Monocular Infrared Image Sequence for Night Vision Applications, IEEE Workshop on Applications of Computer Vision (WACV '07), Feb. 2007, 6 pgs.; Digital Object Identifier 10.1109/WACV.2007.20.
JVC Company of America, JVC Video Cassette Recorder HR-IP820U Instructions (1996). (44 pgs.).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002. (15 pgs.).

(56) References Cited

OTHER PUBLICATIONS

Karen, 'Managers Guide to the DriveCam Driving Feedback System', Jul. 30, 2002 (11 pgs.).
Kathy Latus (Latus Design), 'Case Study—Cloud 9 Shuttle', Sep. 23, 2005 (1 pg.).
Kathy Latus (Latus Design), 'Case Study—Lloyd Pest Control', Jul. 19, 2005 (1 pg.).
Kathy Latus (Latus Design), 'Case Study—Time Warner Cable', Sep. 23, 2005. (1 pg.).
Ki, Yong-Kul, et al., A Traffic Accident Detection Model using Metadata Registry, Proceedings of the Fourth International Conference on Software Engineering Research, Management and Applications; Aug. 9-11, 2006 pp. 255-259 Digital Object Identifier 10.1109/SFRA.2006.8.
Kitchin, Charles. "Understanding accelerometer scale factor and offset adjustments." Analog Devices (1995). (4 pgs.).
Lin, Chin-Teng et al., EEG-based drowsiness estimation for safety driving using independent component analysis; IEEE Transactions on Circuits and Systems-I: Regular Papers, 52(12):2726-2738 (2005); Digital Object Identifier 10.1109/TCSI.2005.857555.
Lisa McKenna, 'A Fly on the Windshield?', Pest Control Technology Magazine, Apr. 2003 (2 pgs.).
Miller, D.P., Evaluation of Vision Systems for Teleoperated Land Vehicles. Control Systems Magazine, IEEE, 8 (3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Panasonic Corporation, Video Cassette Recorder (VCR) Operating Instructions for Models No. PV-V4020/PV-V4520. (40 pgs.).
Passenger Transportation Mode Brochure, May 2, 2006. (2 pgs.).
Patent Abstracts of Japan vol. 007, No. 180 (P-215), Aug. 9, 1983 (Aug. 9, 1983) JP 58 085110 A (Mitsuhisa Ichikawa), May 21, 1983 (May 21, 1983) (1 pg.).
Adaptec published and sold its VideoOh! DVD software USB 2.0 Edition in at least Jan. 24, 2003. (1 pg.).
Ambulance Companies Use Video Technology to Improve Driving Behavior, Ambulance Industry Journal, Spring 2003 (2 pgs.).
Amended Complaint for Patent Infringement, Trade Secret Misappropriation, Unfair Competition and Conversion in *DriveCam, Inc. v. SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424 (13 pgs.).
Answer to Amended Complaint; Counterclaims; and Demand for Jury Trial in *DriveCam, Inc. v. SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History (279 pgs.).
U.S. Appl. No. 11/297,669, filed Dec. 8, 2005, File History (183 pgs.).
U.S. Appl. No. 11/297,889, filed Dec. 8, 2005, File History (77 pgs.).
U.S. Appl. No. 11/298,069, filed Dec. 9, 2005, File History (105 pgs.).
U.S. Appl. No. 11/299,028, filed Dec. 9, 2005, File History (181 pgs.).
U.S. Appl. No. 11/593,659, filed Nov. 7, 2006, File History (296 pgs.).
U.S. Appl. No. 11/593,682, filed Nov. 7, 2006, File History (173 pgs.).
U.S. Appl. No. 11/593,882, filed Nov. 7, 2006, File History (94 pgs.).
U.S. Appl. No. 11/595,015, filed Nov. 9, 2006, File History (171 pgs.).
U.S. Appl. No. 11/637,754, filed Dec. 13, 2006, File History (241 pgs.).
U.S. Appl. No. 11/637,755, filed Dec. 13, 2006, File History (171 pgs.).
Bill, 'DriveCam—FAQ', Dec. 12, 2003 (3 pgs.).
Bill Siuru, 'DriveCam Could Save You Big Bucks', Land Line Magazine, May- Jun. 2000 (1 pg.).
Chris Woodyard, 'Shuttles save with DriveCam', Dec. 9, 2003 (1 pg.).
Dan Carr, Flash Video Template: Video Presentation with Navigation, Jan. 16, 2006, http://www.adobe.com/ devnet/fiash/articles/ vidtemplate_mediapreso_flash8.html (13 pgs.).
David Cullen, 'Getting a real eyeful', Fleet Owner Magazine, Feb. 2002 (1 pg.).
David Maher, 'DriveCam Brochure Folder', Jun. 6, 2005 (2 pg.).
David Maher, "DriveCam Brochure Folder", Jun. 8, 2005 (2 pg.).
David Vogeleer et al., Macromedia Flash Professional 8UNLEASHED (Sams Oct. 12, 2005). (4 pgs.).
Del Lisk, 'DriveCam Training Handout Ver4', Feb. 3, 2005 (16 pgs.).
Drivecam, Inc., User's Manual for Drivecam Video Systems' Hindsight 20/20 Software Version 4.0 (2003). (54 pgs.).
DriveCam, Inc.'s Infringement Contentions Exhibit A, U.S. Pat. No. 6,389,340, Document 34.1, Oct. 20, 2011. (10 pgs.).
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit B, U.S. Pat. No. 7,804,426, Document 34.2, Oct. 20, 2011. (20 pg.).
DriveCam, Inc.'s Infringement Contentions Exhibit C, U.S. Pat. No. 7,659,827, Document 34.3, Oct. 20, 2011. (17 pgs.).
DriveCam, Inc.'s Infringement Contentions Exhibit C, U.S. Pat. No. 7,804,426. Aug. 19, 2011. (47 pgs.).
DriveCam, Inc.'s Infringement Contentions Exhibit D, Document 34.4, Oct. 20, 2011. (2 pgs.).
DriveCam—Illuminator Data Sheet, Oct. 2, 2004. (1 pg.).
Drivecam.com as retrieved by the Internet Wayback Machine as of Mar. 5, 2005 (1 pg.).
DriveCam's Disclosure of Asserted Claims and Preliminary Infringement Contentions in *DriveCam, Inc. v. SmartDrive Systems, Inc.*, Case No. 3:11-CV-00997-H-RBB, for the Southern District of California. Aug. 19, 2011. (6 pgs.).
DriveCam Driving Feedback System, Mar. 15, 2004 (12 pgs.).
DriveCam Extrinsic Evidence with Patent Lr 4.1 .a Disclosures, Nov. 3, 2011. (1 pg.).
DriveCam Extrinsic Evidence with Patent LR 4.1 .a Disclosures, Nov. 8, 2011. (1 pg.).
Driver Feedback System, Jun. 12, 2001 (1 pg.).
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Document 55, filed Jan. 3, 2012, pp. 86-103.
First Amended Answer to Amended Complaint and First Amended Counterclaims; and Demand for Jury Trial in *DriveCam, Inc. v. SmartDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4- 24 (2006); Digital Object Identifier 10.1109/MVT.2006.343641.

(56) References Cited

OTHER PUBLICATIONS

Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.

Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001. (19 pgs.).

* cited by examiner

POWER MANAGEMENT SYSTEMS FOR AUTOMOTIVE VIDEO EVENT RECORDERS

BACKGROUND OF THE INVENTIONS

Field

The following inventions disclosure is generally concerned with automotive on-board diagnostics systems, data and power distribution networks and specifically concerned with on-board diagnostics networks and their coupling with smart power management systems arranged to provide power to connected video event recorders.

Prior Art

As automobiles generally include autonomous electrical power supply systems, it is important to carefully arrange and couple electrical power consuming devices to avoid overburdening the capacity of the supply. One understands completely how headlamps left energized while an engine is not running tends to render the power supply system completely drained in only a few hours The headlamps consume the entire stored electrical capacity which is not renewed when the engine is not turning an electrical generator. When an engine is running, headlamps may be left on indefinitely as the alternator supplies ample energy to the headlamps while at the same time providing energy to recharge the storage battery. Accordingly, installation of automotive systems and devices which consume electrical power should be designed with a view towards consuming power in accordance with its availability.

It is quite well known in the automotive arts that non-essential electrical subsystems may be coupled in series with an ignition system whereby power is cut-off during times when the ignition switch is in an 'off' position. Vehicle operators who leave a car taking keys along with, necessarily cause power to be disconnected from those instruments so coupled via the ignition switch.

It is however sometimes desirable to leave some systems connected to the power supply even when an ignition system is in an "off" position. Power remote door lock systems require continuous power supply in order to remain operative. Accordingly, those systems are not coupled to the electrical power supply via the ignition, but rather, via a circuit which remains energized at all times.

Certain new advanced electronic systems are now being made available for use in conjunction with an automobile in service. One important new system is known as a "video event recorder". Video event recorders are being deployed in service and fleet vehicles in a manner whereby a video record relating to vehicle use is electronically stored for further review. A primary example of these systems includes installation of digital video recorders with police cruiser type patrol vehicles. A police cruiser is frequently in a position where a video record is quite useful to have. In addition, more and-more fleet type vehicles are being equipped with video event recorder systems. A vehicle fleet is an important corporate asset which benefits from protection via use of these mobile video systems.

Present, state-of-the-art video recorders are connected to the electrical power supply via a 'hardwire' or direct, unswitched connection. In this way, power is continuously provided to the video systems as long as the source is able to supply it. This enables the video system to capture video images even when an ignition key has been removed from the vehicle. However, the amount of energy consumed can be non-negligible. Indeed, it is entirely possible to completely the drain an automobile battery with these constantly connected video systems in a short period (a few days is certainly enough; under some circumstances a far shorter time will deplete a battery).

A further problem arises which is a bit more subtle but nevertheless important. Automobile type batteries are designed to supply a very large current in a short burst and to be recharged or 'topped off' shortly thereafter. Thus, the physical configuration of the battery supports a preference for a "fully charged" state. It is possible to configure a battery for efficient operation at reduced charge levels, but automobile batteries are not designed this way. A typical yacht battery in contrast, sometimes known as a "deep cycle" battery is designed for use in this manner. While it is certainly possible to use a deep cycle type battery in vehicles with 'always-on' video event recorders, this solution is a bit impractical. It is not desirable to impose new requirements on a vehicle's electrical supply system because a certain install configuration, i.e. "always on", is somewhat desirable.

Another approach in the art suggests that a video event recorder be coupled to the power supply by the ignition switch. When the switch is in the "off" position, the video event recorder no longer consumes electrical power and remains inoperative until the ignition is reactivated. This is a valuable approach, but unfortunately leaves the video event recorder without power at certain times when it would be desirable to have power. This solution is also accompanied by the difficulty of providing an installation which couples to the ignition switch which may vary greatly from one vehicle model to another. It is a great disadvantage to attempt such connections to automobile power systems.

It is possible to provide a video event recorder with coupling to a power supply via an independent switch which may be operated without regard to the ignition. However such manual type switch couplings suffer from a great number of inconveniences and difficulties which need not be enumerated here.

It is thus desirable to provide a system which permits efficient coupling to a vehicle's power system, that does not overload a supply by consuming power during times when the system cannot sufficiently provide supply, and further to cooperate with standard equipment available in all models of vehicles. These, among other motivations, lead to systems described in detail here following.

SUMMARY OF THESE INVENTIONS

Comes now, Bruce Lightner, Ramesh Kasavaraju and James Plante with inventions of power management systems in conjunction with video event recorders. It is a primary function of these systems to provide advanced power couplings for video event recorders. It is a contrast to prior art methods and devices that these systems first presented here couple to a vehicle's power source with regulation thus preventing an unnecessary drain of power and sometimes total system malfunction. A fundamental difference between video event recorders of these inventions and those of the art can be found when considering its installation and connection with regard to an on-board diagnostic system.

Video event recorders of these inventions are coupled to an automotive power supply via an on-board diagnostics system (OBD) power bus. And on-board diagnostics system scanner port includes a connector having at least one lead associated with a power supply function. Installation of a video event recorder in agreement with these teachings includes a connection from the video event recorder to the widely available on-board diagnostics system scanner port;

specifically, to the lead associated with the power bus. These systems may include a standard OBD male "D"-type connector separated by an interconnecting cable of sufficient length, to the video event recorder which may be mounted at or around a vehicle windscreen.

In most important versions, a power management module is included between the OBD system and the video event recorder to regulate and control power provided thereto. A power management module includes means to determine periods when a vehicle is in an "in-use" and in a "standby" mode. Upon detection of an "in-use" condition, the power management module powers up the video event recorder so that it functions normally. When a vehicle is "standing by" for extended periods, the power management module cuts power so that excess is not consumed; thus preserving battery life. Vehicle use status may be determined by various indicators. In some versions, the voltage level on the power supply system implicitly indicates whether or not the engine is running. Thus a voltage measurement may be used to switch power to the video event recorder in agreement with a declared "in-use" state. Alternative versions of power management modules include use detection schemes having a motion sensor to determine whether or not the vehicle is still for an extended period of time. In the case where motion is detected, an "in-use" state is declared and power is supplied to the video event recorder by way of the cable connecting the power management module and OBD system scanner port to the video event recorder.

A power management module may be devised to listen to data bus for certain specified data traffic. When prescribed data traffic is present an assumption regarding use state may be made. In this case the power management module may provide a response where power is switched in accordance with the information sensed on the various data buses of the on-board diagnostics system. Finally, in some advanced versions, combinations of motion, voltage level detection, and prescribed types of data traffic are used to define thresholds for an "in-use" status.

Objectives of these Inventions

It is a primary object of these inventions to provide couplings between video event recorders and automotive type power supply systems.

It is an object of these inventions to provide electrical coupling and power management for video event recorders.

It is a further object to provide power supply couplings for video event recorders in conjunction with on-board diagnostic systems.

It is an object of these inventions to provide switched power supply couplings to reduce power consumption when a vehicle is in a stand-by or non-use mode.

In some versions, it is an object to provide power management where switching is coupled to the charging state of a supply system.

In alternative versions, it is an object to provide power management where switching is coupled to detected vehicle motion.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

GLOSSARY OF SPECIAL TERMS

Figure 1:
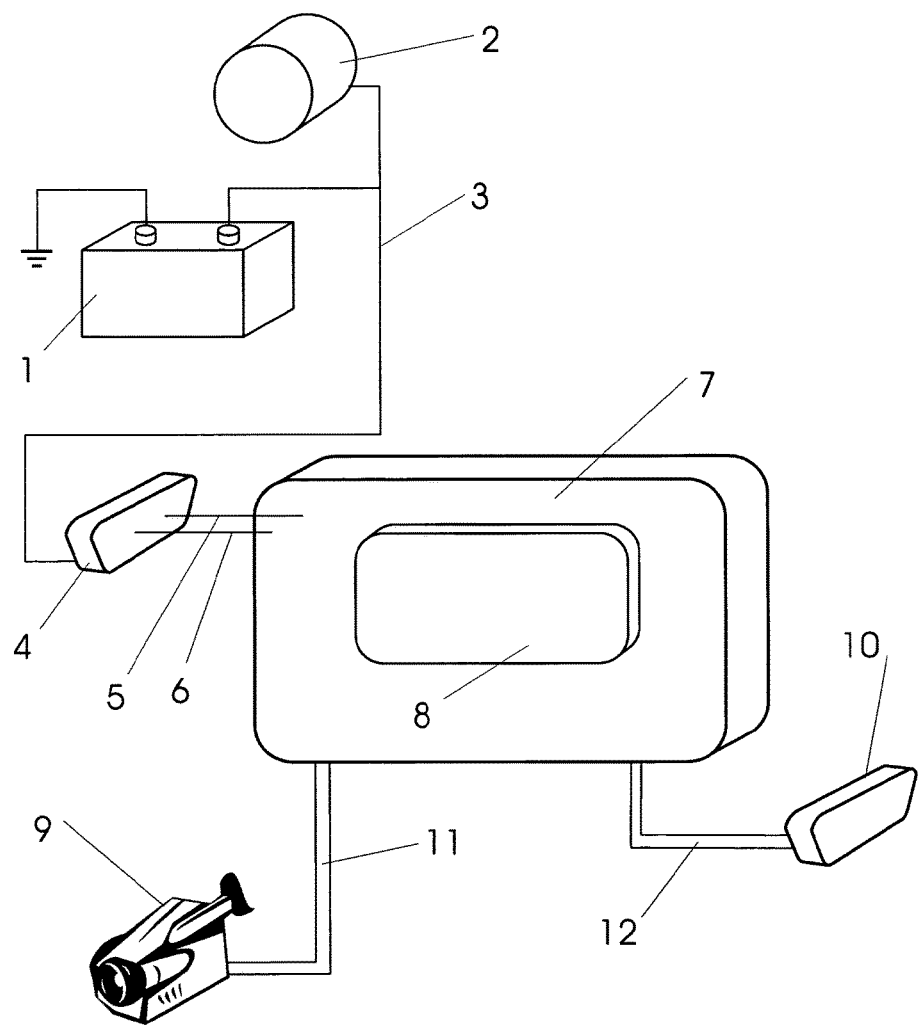
FIG. 1 is an illustration of major system components and their relation with vehicle systems.

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Video Event Recorder—VER

A video event recorder is a system arranged to capture data in response to a triggered event, data captured relates to use and performance of the vehicle and includes images from a digital video camera and numeric measurements.

On-Board Diagnostics System—OBD

An 'on-board diagnostics' system includes standard electrical network provided and used in the automotive industry for data and power distribution and sharing. While a most common implementation is sometimes known as OBDII, it is explicitly noted here that a broad definition of 'OBD' is meant as a general term including various standards, both commercial and consumer, of data and power distribution networks used in vehicles.

"D"-Type Connector

"D"-type connector is an electrical connection means including a mechanical interlocking system whereby a plurality of electrical connections are made when mating parts are coupled together.

"In-Use" Detector

An "in-use" detector is a system arranged to declare the operational state of a vehicle in either of two exclusive states including "in-use" and "stand-by".

PREFERRED EMBODIMENTS OF THESE INVENTIONS

In accordance with each of preferred embodiments of these inventions, apparatus for power management in vehicle event recording systems are provided. It will be appreciated that each of the embodiments described include an apparatus and the apparatus of one preferred embodiment may be different than the apparatus and method of another embodiment.

In simplest versions of these inventions, a video event recorder is coupled and connected to an on-board diagnostic system at its scanner port. Newly manufactured vehicles are now mandated to include an on-board diagnostic system. These systems most generally include an electrical access port into which an on-board diagnostics type scanner tool may be plugged. The connector associated with this port, sometimes and herein referred to as a "D"-type connector, is generally located under the dashboard at the left-hand or driver's side. A video event recorder provided with an electrical cable suitable for extending from a mounting position at or about a windscreen to the under dashboard location, and a suitable mating "D"-type connector, may be coupled to a standard on-board diagnostic system (modern versions of on-board diagnostic systems are presently referred to as OBDII to reflect being a second generation). The video event recorder benefits from such installations because it can receive both power and data from the on-board diagnostic system.

Accordingly a first preferred embodiment is an automotive electrical power management system with an electrical power source (car battery); an on-board diagnostics system (standard installed); and a video event recorder. The electrical power source is coupled to the on-board diagnostic system in a manner to supply electrical power thereto, particularly on a prescribed power bus. The video event recorder's power input is electrically connected to said on-board diagnostic system power bus.

Since the preferred location for mounting a video event recorder camera and the location of an on-board diagnostic system scanner port connector are predefined and not readily adjustable, the systems include special electrical cable which extends between these two locations. For all practical cases, at least 8 inches must be allocated between a video event recorder and a "D" connector suitable for coupling with an on-board diagnostic scanner port. Accordingly, these devices include the systems where a video event recorder is separated from an on-board diagnostic system "D" connector by eight or more inches of cable.

In some versions, a video event recorder is coupled to an on-board diagnostic system by way of its scanner port and receives therefrom supply of electrical power without regard for on-board diagnostic systems data networks. In more advanced versions, a video event recorder is coupled to an on-board diagnostic system and receives both power and data therefrom. Thus, a cable may only support a power coupling. That is, a cable may be as simple as having only one lead, that lead being coupled to pin 16 of the "D"-type connector. However, in a preferred versions, the cable supports data and power couplings. As such, these cables include a plurality of leads including those arranged in view of an OBD standard including various data buses, power supply line, and electrical ground. While it is conceivable that a cable be only 8 inches in length, in most versions a cable will exceed that measure. Cameras mounted behind a windscreen at a rearview mirror would require a cable of a few feet in length. For professional and tidy installations, it is preferred that a cable be installed to cooperate with the interior design of a vehicle operator/passenger compartment; as such, the cable may require additional length whereby it can be routed around and near interior trim features for example.

Because installations as presented consume the place otherwise allocated for an on-board diagnostics system scanner plug-in, it is sometimes important to provide an auxiliary port into which a scanner tool may be coupled. It is further desirable to provide the support in a manner which does not require disassembly or uninstallation of the video event recorder and its related systems. Thus, in some preferred versions, an auxiliary port is provided such that a scanner tool may be simultaneously coupled to the on-board diagnostics system. However, in some vehicles this can be problematic. Since the video event recorder is arranged to appear to the OBD system to be a scanner, i.e. some video event recorder versions are arranged to communicate on the data buses in a manner which emulates a scanner, the presence of a "second" scanner can cause protocol conflicts. Accordingly, some of these systems are devised with special means to detect the presence of a scanner tool and to disable data communications in the video event recorder during those times. Note it is not necessary to disable the power applied to the video event recorder and the camera may be arranged to continue to capture video despite the presence of a scanner tool.

While the versions presented above are quite useful in their base form, they may be further improved by inclusion of a power management module. A power management module may be electrically coupled to the on-board diagnostic system; particularly to the power bus. A power management module can be arranged between the on-board diagnostic system and a camera unit of the video event recorder such that it operates to detect when a vehicle is in-use or in-standby mode and respond by applying or removing power from the video event recorder. In best versions a "D" connector is separated from a power management module by a short cable which leads to a power management module housing containing electronics therein. A second cable runs from the power management module to the video event recorder which may be remotely mounted. In this way it is possible to easily mount the power management module out of harm's way and under the dashboard of the vehicle. This mounting is best taken up quite near the same location the original vehicle manufacturer installed the on-board diagnostic system scanner port.

In preferred versions a power management module is comprised of an "in-use" detector and a switch. An "in-use" detector is arranged to determine whether or not a vehicle is in an active operational state or conversely in a standby state. An "in-use" detector has a binary output coupled to drive or toggle the switch. The two poles of the switch may be coupled one each to the power supply line of the on-board diagnostic system and the power input of the video event recorder. When a determination is made as to a change in the vehicle operating state, the "in-use" detector provides a corresponding signal to the switch which causes power to be applied or removed from the video event recorder camera.

An "in-use" detector includes a portion to sense physical parameters of the vehicle and/or on-board diagnostic systems and to compare a measurement value with a prescribed threshold value the result of such comparison being application of a switch toggle signal where appropriate. In one preferred version, an "in-use" detector is arranged as a voltage sensor coupled to the vehicle power source by way of the on-board diagnostic system. Automobile electrical systems are quite standard the world over. In general, nearly all vehicles used a 12V direct current power supply. A standard automotive Pb/acid battery comprises six cells each connected in series with the others typically produces between about 1.9 and 2.1V. This is set and nonnegotiable as the device chemistry causes it to be so. To charge these batteries, one need merely apply a voltage a bit higher than that produced by the battery to result in a reverse current and a charging action. Thus an automobile electrical system generally includes an alternator charging system which produces about 14V applied to the battery "high" potential side. When a battery is properly coupled to an effective charging system, the entire power supply system remains at 14V at all times while the charging system is active. Thus if one measures the voltage of a car's electrical system it will be about 12V when a car is not running (stand-by) and 14V when running (in-use). Accordingly, if one were to detect the voltage of an automobile power supply at any time, it is possible to determine whether or not the engine is running or in an "in-use" state.

In a second preferred version, an "in-use" detector is arranged with a motion sensor. A motion sensor is not part of the on-board diagnostic system but rather is provided as part of the power management module. Motion sensors can be arranged to detect very slight motion. In this way, a power management module can be made responsive to subtle movements such as merely opening a door of a vehicle. Thus an operator's entry into the vehicle sets the vehicle into an "in-use" state and consequently results in a 'wake-up' of the VER as power is applied. Certainly while a vehicle is in motion on roadway motion detector continue to indicate that the vehicle is being used.

In a third preferred version, an "in-use" detector is set up to monitor data traffic on either of the data buses of the on-board diagnostic system. Where a certain prescribed type of data traffic is detected, an "in-use" state may be declared. Similarly, when data silence or some other prescribed form of data traffic is found, a "stand-by" state may be declared. In response to either of these determinations, the "in-use" detector may provide the switch with a driving signal which sets the switch position according to the use state detected. Thus, activity on the on-board diagnostic system data buses can also be used to provide indication as to the use state of a vehicle via an in-use detector which is part of a power management module.

While each of these "in-use" detection schemes provides certain benefit, there may be other occasions where each of these in combination with another may provide an even more effective system. Thus these inventions anticipate "in-use" detectors where a plurality of physical measurements are made and compared with thresholds and processed through a logic system which finally has a single binary output coupled to the power switch.

A more detailed understanding may be realized in view of the figures appended hereto which include reference numerals associated with the various important elements. In particular, FIG. 1 illustrates major system elements and various cooperation there between. The battery of electrical cells 1 stores electrical energy during times when a vehicle engine is not running; or while the electrical system is herein said to be in a 'standby' mode. An alternator type electrical generator 2 connected to a vehicle's engine produces electricity whenever the engine is running. Together, the battery and alternator and their respective supporting systems, (voltage regulator for example) make up the DC power source for automobiles.

A power line 3 is coupled to an on-board diagnostics system OBD represented in the diagram by its connector 4 symbol. An OBD system includes both a power distribution network/bus 5 and eight data network/bus 6.

A power management module 7 is arranged to interface directly with the OBD system. Thus the power and data buses may be controlled and managed by the power 30 management module. A special portion of the power management module includes an "in-use" detector 8. An "in-use" detector is arranged to determine the periods when the vehicle is in use or is actively being operated. This may be accomplished in various ways. Among the most important ways include a power source voltage detection system, a motion detector system, and a data traffic detection system. Beside these, alternative forms of "in-use" detection systems are possible. The power manager module is coupled to a video event recorder 9 and provides power only at appropriate times. For example, when the vehicle is parked and at rest for long periods, it is not useful for the video event recorder to continue to consume power. In these times, the power manager module disconnects power to the video event recorder and the video event recorder no longer consumes power. When the power management module determines the vehicle has entered into an in-service or "in use" status, the power management module activates couplings to the video event recorder with appropriate power and data connections. In addition, a power management module of these inventions may further include an auxiliary OBD interface port 10 to provide scanner tools easy access to the OBD system while the power management module and video event recorder remain installed without interruption.

Figure 2:
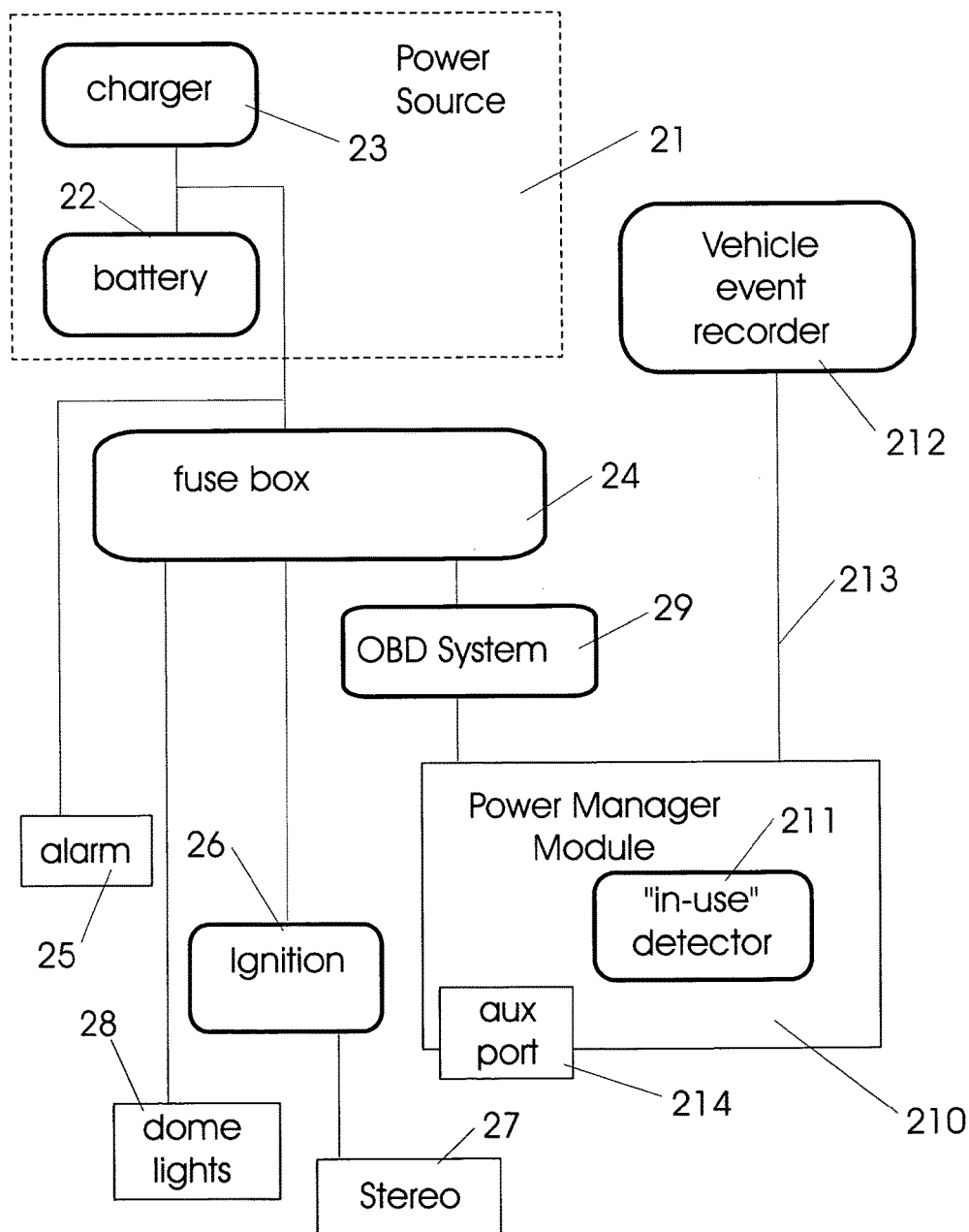
FIG. 2 is a block diagram showing major elements and their couplings with cooperating elements.

FIG. 2 illustrates in block diagram important elements in vehicle power and data networks. One may consider this diagram in gaining a better understanding of various possible connection types to a vehicle power source 21. A power source includes a battery type electrical storage system 22 and a power generation means or charger system 23. A vehicle's power supply is generally connected to all consuming devices by way of a fuse box 24. A fuse box may distribute power to various of vehicle subsystems as it is designed to support a plurality of distinct electrical circuits. While nearly all systems are connected by way of the fuse box, in special circumstances it may be desirable to "hardwire" a device to the power source. An alarm system 25 is more tamperproof if the fuse box is bypassed because it would remain operable even when a thief attempts to disable it at the electrical junction/fuse box.

Most vehicle subsystems are connected to the power source in a series circuit which includes the vehicle ignition system 26 in this way, power is cut off to these devices whenever the ignition is in an 'off' state. A stereo system 27 is a good example of an automotive electrical appliance which is preferably not permitted to operate when the ignition is off. A stereo left on could easily consume all available power and run a battery down completely. In contrast, some electrical systems are better left operable without regard for the state of the ignition system. A dome light 28 provides a certain additional safety system which is nice to have available even when a key is not in the ignition. For example, a light might be useful when looking for a dropped ignition key!

Most modern production automobiles now include an on-board diagnostics system as standard equipment. And OBD system 29 includes both data buses and a power bus. The power bus of an OBD system is needed even when an ignition is in the 'off' position. Consequently an OBD power bus is connected directly to the fuse box. This makes power available to OBD coupled systems at all times without regard to the state of the ignition. An important primary element of these systems is a power management module 210. A power management module is coupled to an OBD system including the power bus and data buses. In preferred versions, a power management module is plugged into the standard scanner port connector under the dashboard in most cars.

A power management module comprises an "in-use" detector 211 which determines whether or not the vehicle is in use and provides power to a video event recorder 212 along extension cable 213 whenever such determination is made. The "in-use" detector includes subsystems to detect certain physical conditions and to provide a binary output to a switch which couples OBD power bus to the video event recorder.

Because a these systems may be plugged into the only available scanner port, the presence of them tends to disrupt easy availability of scanner access to the OBD. Accordingly, it is sometimes advantageous to include as part of a power management module, an additional physical connector fashioned in parallel as an OBD interface or auxiliary scanner port 214.

Figure 3:
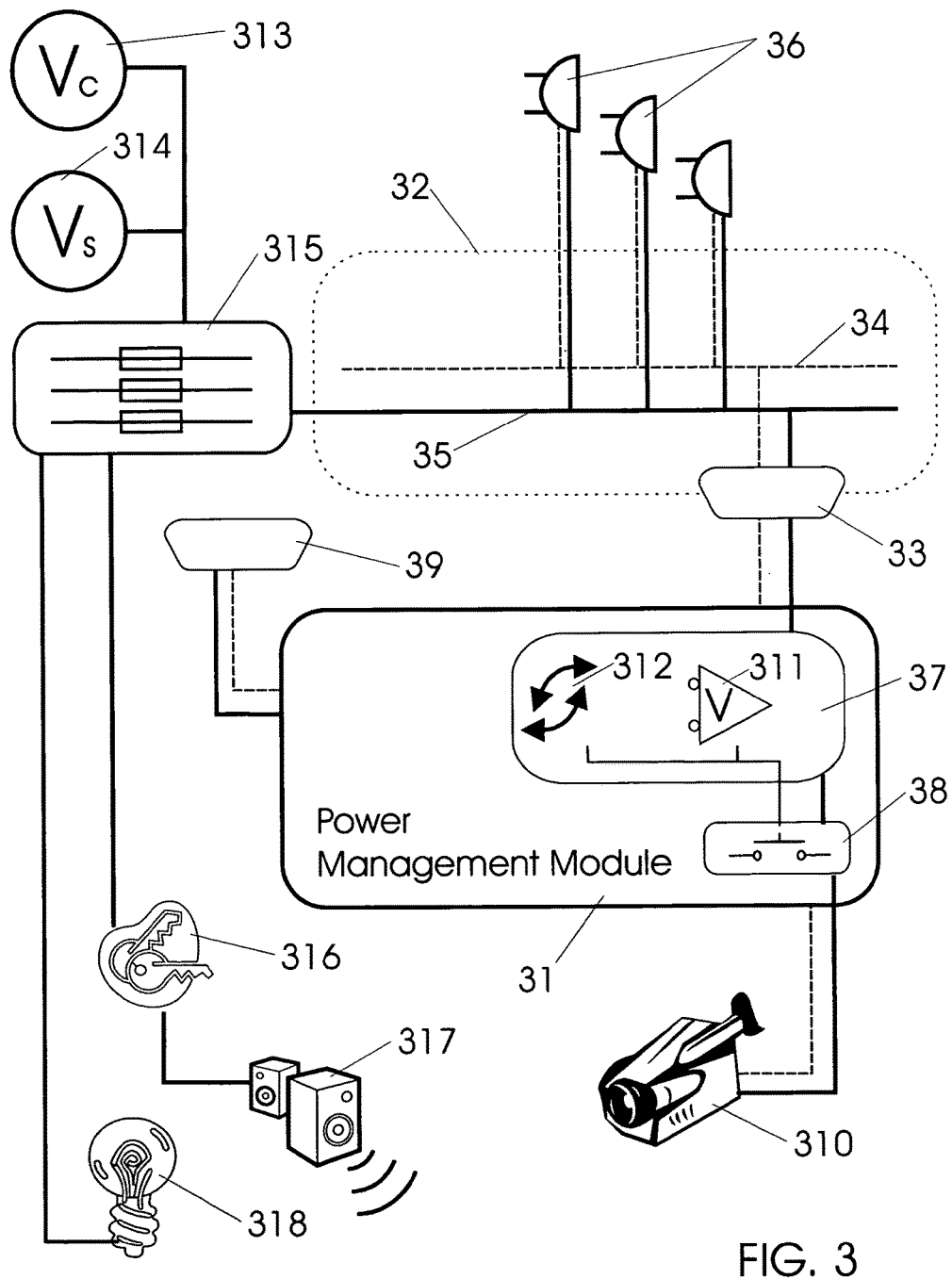
FIG. 3 is schematic diagram to further illustrate the electrical relationship between coupled systems.

The schematic diagram of FIG. 3 further illustrates primary elements and couplings between primary elements from which these systems are comprised. A most important element is the power management module 31. The power management module is designed and engineered to couple intimately with the standard diagnostic buses widely used in automobile industries including those known as OBDII 32. These two systems may be physically joined at a common connector 33, a 16 pin "D" connector. The 16 and support several data bus protocols on various pins (for example on pin 6, 10, 14, 15), grounded contacts, and a single power supply bus 35 on pin 16. This coupling is easily achieved without disrupting any of the many OBD coupled systems 36. The power management module is comprised of three main subsystems including an "in-use" detector 37, a switch 38, and an auxiliary port 39.

The "in-use" detector is arranged to detect and declare a vehicle to be "in use". When an "in-use" condition is detected, the "in-use" detector toggles the switch to connect power from the OBD to the video event recorder 310. The "in use" detector may determine an "in-use" condition in several alternative or cooperative ways. In a first way, the "in-use" detector includes a comparator 311 having one input coupled to the OBD power bus and one input coupled to a reference voltage. The comparator has an output coupled to the switch. When a vehicle is "standing by", or not in use, the voltage on the power supply bus is approximately 12 V. When the engine is running the charging system with a voltage regulator produces about 14 V. So, if a reference voltage of 13 V is selected for a comparator input, when an engine begins to run the comparator will drive the switch to provide power and enable the video event recorder during times when the vehicle is being used or at least at times while the engine is running. It has been found via experimentation that 13.2 is a particularly effective threshold as some standard batteries run with voltage a bit higher than 12 but rarely if ever above 13.2. It is not necessary to use the charging voltage of the power supply to determine if the car is being used. Sometimes it is advantageous to declare an "in-use" state merely upon detection of subtle motion. Accordingly, some versions of these power management modules include a motion sensor 312. Even the slight movements can be used to trigger power up of a video event recorder. When a vehicle remains motionless for an extended period, a stand-by state may be declared and power from the OBD to the video event recorder may be interrupted or switched off. The switch which is driven by signals from the "in-use" detector is arranged between the OBD power bus and the video event recorder whereby power to the video event recorder may be interrupted at times when the vehicle is not in use.

An auxiliary scanner port 39 is sometimes included in preferred versions of these power management module systems. It is highly desirable to provide a tidy installation for video event recorders which leaves the vehicle and all its systems unimpaired and fully functional. Therefore it is an important aspect of preferred versions that the standard manufacture installed OBD scanner port not be blocked. To effect this, these systems include a physical connector into which a standard OBD scanner may be inserted without removal of either the power management module or the video event recorder. However, it is not only the physical connector which must be provided but also a bit of logic management. Because conflicts may arise when two scanners are present on an OBD system, a mechanism is included to interrupt data communicates with the VER whenever a scanner is present in the auxiliary port. In the way, the OBD system only "sees" a single scanner at any given time.

One will now fully appreciate how video event records are best couple to automotive power supply systems. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

What is claimed is:

1. An automotive electrical power management system of a vehicle, the system comprising:
   a DC electrical power source;
   an on-board diagnostics system; and
   a video event recorder including a camera unit, a cable, an auxiliary female connector, and a power input,
      wherein the cable includes a terminating connector suitable for coupling with the on-board diagnostics system,
      wherein the cable is a video event recorder power supply line coupled to the power bus on an individual pin of the power bus, and
      wherein the auxiliary female connector is arranged in parallel and configured to receive therein an on-board diagnostics system scanner,
   wherein the DC electrical power source is coupled to the on-board diagnostics system to supply direct current electrical power thereto on a power bus of the on-board diagnostics system,
   wherein the power input is electrically coupled to the power bus.

2. The system of claim 1, wherein the DC electrical power source is an electrical power source of the vehicle.

3. The system of claim 1, wherein the power management module further comprises an in-use detector configured to determine whether the vehicle is in use.

4. The system of claim 3, wherein the power management module further comprises a switch arranged on a power supply line between the DC electrical power source and the video event recorder, wherein the switch is configured to provide power to the video event recorder upon activation of the switch, and wherein the switch is further configured to leave the video event recorder unpowered upon deactivation of the switch.

5. The system of claim 4, wherein the in-use detector is further configured to activate the switch response to determining that the vehicle is in use, and wherein the in-use detector is further configured to deactivate the switch responsive to determining that the vehicle is not in use.

6. The system of claim 5, wherein the in-use detector determines that the vehicle is in use and activates the switch responsive to vehicle ignition and then at least one other physical parameter of the vehicle breaching a corresponding threshold, wherein the at least one other physical parameter is determined based on output signals generated by one or more sensors of the vehicle.

7. The system of claim 3, wherein the in-use detector comprises one or more sensors configured to generate output signals conveying information related to physical parameters of the vehicle, the physical parameters of the vehicle including one or more of a voltage on the power bus, a vehicle ignition parameter, or a vehicle motion parameter.

8. The system of claim 7, wherein the in-use detector is configured to determine one or more physical parameters of the vehicle and compare individual ones of the physical parameters to corresponding threshold values for the physical parameters, and, responsive to one or more of the physical parameters breaching one or more of the corresponding threshold values, determine whether the vehicle is in use.

9. The system of claim 8, wherein the in-use detector determines that the vehicle is in use responsive to at least two physical parameters breaching corresponding thresholds.

10. The system of claim 3, wherein the in-use detector is a motion sensor.

11. The system of claim 1, wherein the video event recorder is wired to a vehicle bus network of the vehicle and wherein the video event recorder receives power and vehicle data directly from the vehicle bus network.

12. The system of claim 11, wherein the camera unit is configured to capture images from in and/or around the vehicle, wherein the video event recorder is configured to detect a vehicle event based on the captured images and the vehicle data from the vehicle bus network, and wherein, responsive to detecting the vehicle event, the video event recorder is configured to record images from in and/or around the vehicle and the vehicle data from the vehicle bus 25 network associated with the vehicle event in electronic storage.

13. An automotive electrical power management system comprising:
 a DC electrical power source;
 an on-board diagnostics system;
 a video event recorder including a camera unit, a power input, and a cable; and
 a power management module including an auxiliary female connector,
  wherein the DC electrical power source is coupled to the on-board diagnostics system to supply direct current electrical power thereto on a power bus of the on-board diagnostics system,
  wherein the power input is electrically coupled to the power bus,
  wherein the power management module is electrically coupled to the power bus and arranged between the power bus and the camera unit of the video event recorder,
  wherein the cable includes a terminating connector suitable for coupling with the power bus,
  wherein the power management module is arranged on the cable nearer to the terminating connector than to the camera unit, or directly attached to the power bus, and
  wherein the auxiliary female connector is arranged in parallel and configured to receive therein an on-board diagnostic systems scanner.

14. The system of claim 13, further comprising a switch to disable data communications to and from the camera unit while an auxiliary scanner is detected as being connected at an auxiliary port.

15. An automotive electrical power management system comprising:
 a DC electrical power source;
 an on-board diagnostics system;
 a video event recorder including a camera unit and a power input; and
 a power management module including an in-use detector and a switch,
  wherein the switch is arranged on a power supply line between the DC electrical power source and the video event recorder,
  wherein the switch is configured to provide, upon activation of the switch, power to the video event recorder, and
  wherein the switch is further configured to leave, upon deactivation of the switch, the video event recorder unpowered,
 wherein the DC electrical power source is coupled to the on-board diagnostics system to supply direct current electrical power thereto on a power bus of the on-board diagnostics system,
 wherein the power input is electrically coupled to the power bus,
 wherein the power management module is electrically coupled to the power bus and arranged between the power bus and the camera unit of the video event recorder,
 wherein the in-use detector is configured to determine that the vehicle is in use and subsequently activate the switch responsive to vehicle ignition.

16. The system of claim 15, wherein the in-use detector comprises a comparator having a first input coupled to the DC electrical power source, a second input coupled to a reference voltage, and an output coupled to the switch.

* * * * *